United States Patent [19]

Karapetian

[11] 3,717,083
[45] Feb. 20, 1973

[54] SECONDARY BARBEQUE GRILL
[76] Inventor: Carl Karapetian, 19975 Roslyn Road, Detroit, Mich. 48221
[22] Filed: Oct. 6, 1971
[21] Appl. No.: 187,081

[52] U.S. Cl. ..................... 99/450, 99/445, 126/25 R
[51] Int. Cl. ................................................ A47j 37/06
[58] Field of Search ........ 99/402, 339, 444, 445, 450; 229/3.5 MF; 126/25 R, 39 M

[56] References Cited

UNITED STATES PATENTS

| | | | |
|---|---|---|---|
| 2,466,859 | 4/1949 | Northup | 126/19 |
| 2,999,452 | 9/1961 | Hardy | 99/402 |
| 3,082,757 | 3/1963 | Hohe | 99/445 X |
| 3,509,814 | 5/1970 | Karapetian | 99/445 |
| 3,555,994 | 1/1971 | Nemetz | 99/444 |
| 3,570,469 | 3/1971 | Jones | 126/25 R |
| 3,599,558 | 8/1971 | Goldberg | 99/339 |

Primary Examiner—Billy J. Wilhite
Assistant Examiner—Arthur O. Henderson
Attorney—Price, Heneveld, Huizenga & Cooper

[57] ABSTRACT

An improved disposable secondary grill for use with a primary or permanent grill to allow the barbequing of foods without contact with the surfaces of such primary grills. The improved secondary grill comprises a unitary body having top surfaces with openings therein to allow the passage therethrough of radiant heat, such openings being defined by bar-like strips having cross-sectional widths in the shape of an open C and lengthwise undulations to vertically space the food to be cooked from the surfaces of the primary grill.

9 Claims, 7 Drawing Figures

PATENTED FEB 20 1973  3,717,083

SECONDARY BARBEQUE GRILL

This invention relates to disposable barbeque grills for outdoor cooking and the like and, more particularly, to disposable secondary grills for use in connection with primary or permanent grills.

BACKGROUND OF THE INVENTION

Outdoor cooking using barbeque grills to cook and heat food with gas or charcoal has become very popular in many parts of the world. In the United States, it has become very common for counties and states to provide numerous barbeque grills along public roadways and in public parks for use by picnickers and travelers. In the course of the outdoor cooking season many individuals utilize the same barbeque grills. Thus, it is apparent that many types and varieties of meats and foods may be cooked on these same grills. Generally, the picnickers and travelers do not take the time to clean the grills before use. Therefore, after a short time the residual fats, juices and food particles from previous users are heated and baked onto the permanent grill surfaces. Similarly, since these public grills are exposed to the elements including animals, many undesirable substances may become deposited on the surfaces of such grills. Therefore, it is apparent that without cleaning, these grills are often in an unsanitary condition. Therefore, the need is apparent for a disposable cover or surface to be used in connection with such permanent grills to avoid these unsanitary conditions.

In the past, several disposable secondary barbeque grills have been disclosed. Typical of these is the disposable grill disclosed in United States Pat. No. 3,509,814. That disposable secondary grill was designed to be self-supporting and to have the ability to collect the various juices and provide a container for their removal from the cooking areas. However, in the course of further developing the earlier secondary grill, several innovations were concerned, thereby greatly facilitating the ease and economy of manufacturing such secondary grills, while simultaneously imparting significantly greater strength to the completed product.

Accordingly, it is the principle object of the present invention to provide an improved, disposable, secondary barbeque grill. The improved secondary grill performs many of the desirable functions of the earlier secondary grill in that it is heat resistent, may be placed on the surface of the permanent grill, and spaces the food to be cooked away from the surface of the permanent grill such that sanitary cooking conditions are preserved. Additionally, however, the improved disposable secondary grill is susceptible of extremely rapid, simple and inexpensive manufacture with the common and well-known punch press or the like. The improved secondary grill is structurally sufficient to support the full range of foods normally cooked on an outdoor barbeque grill and may be used with any size or shape of primary or permanent grill.

SUMMARY OF THE INVENTION

The novel and improved features of this invention may be accomplished by providing a disposable secondary grill for outdoor cooking in the following manner. The disposable secondary grill is formed from a unitary body of thin, sheet, metallic material such that the body comprises a peripheral frame having a top surface and supporting sidewalls depending downwardly therefrom along the opposing edges of the top surface. A plurality of openings are formed in the top surface to allow the radiant heat from a charcoal or gas heat source in the primary grill to pass therethrough and to cook the supported food. These openings are defined by bar-like strips depending from the peripheral frame in a generally parallel arrangement and have depending side flanges extending downwardly and lengthwise of the bar-like strips. The bar-like strips have a plurality of undulations along their length. The downwardly extending flanges of the bar-like strips at the bottom of the undulations, and the bottom of at least portions of the sidewalls depending from the top surface of the peripheral frame, all lie in a common plane. These serve as the contact surface to support the secondary grill. Several bendable tabs are secured to the secondary grill at various positions in order to anchor the secondary grill to the primary grill. The various sections of the peripheral frame and the bar-like strips are formed into a generally semi-circular cross-section opening downwardly to add structural strength to the grill. It is apparent that when the secondary grill is resting on the common plane formed by portions of the downwardly extending sidewalls and flanges that the food to be cooked will rest on the upper surfaces of the undulations formed in the bar-like strips and thereby be spaced vertically from the unsanitary surface of the permanent grill. The lower portions of the undulations provide pockets for holding certain types of foods such as hot dogs and link sausages. The depending sidewalls and flanges of the secondary grill will space such foods above the primary grill even when these foods rest in the bottoms of the undulations. When the food has been cooked, the disposable grill may be crushed with a moderate force and disposed of in a trash can.

These and other objects, advantages and features of the invention will become apparent from a study of the following description taken in conjunction with the drawings.

DESCRIPTION OF THE PREFERRED EMBODIMENT

Figure 1:
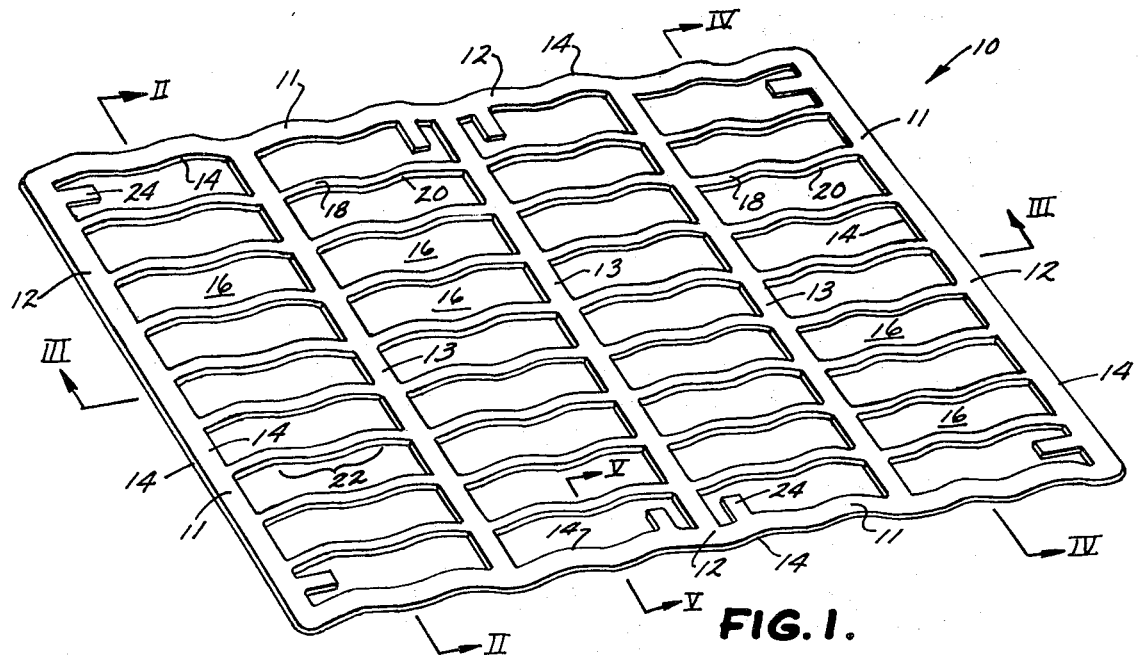
FIG. 1 is a perspective view of the preferred embodiment of the invention.
Figure 2:
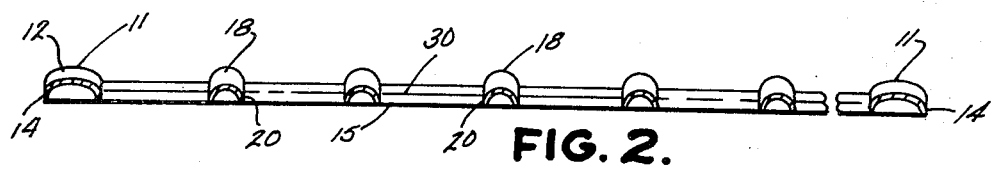
FIG. 2 is a fragmentary, cross-sectional view of the preferred embodiment of the invention taken along line II—II of FIG. 1.
Figure 3:
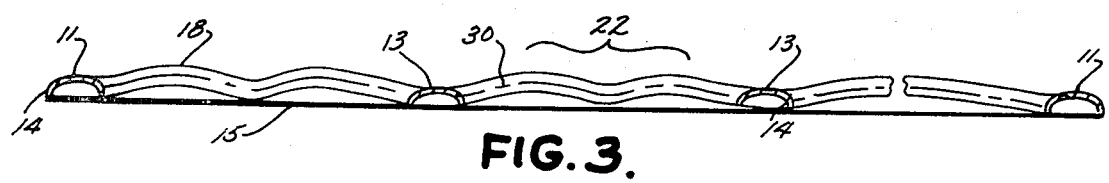
FIG. 3 is a fragmentary, cross-sectional view of the preferred embodiment of the invention taken along line III—III of FIG. 1.
Figure 4:
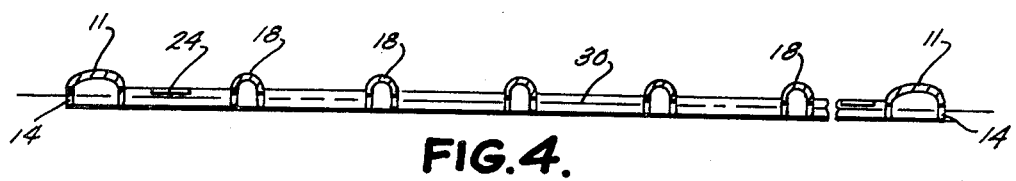
FIG. 4 is a fragmentary, cross-sectional view of the preferred embodiment of the invention taken along line IV-IV of FIG. 1.

The improved disposable secondary grill is shown generally at 10 and has a peripheral frame 11. The frame 11 has supporting sidewalls 14 depending downwardly therefrom and extending along at least two edges of its top surface 12. A plurality of openings 16 is formed in top surface 12 to permit radiant heat from the heat source in the primary grill (not shown) to pass therethrough. Openings 16 are defined by a plurality of bar-like strips 18 having side flanges 20 depending downwardly therefrom and extending lengthwise along strips 18. A plurality of undulations, shown generally at 22, are formed in the strips 18. The bottoms of the side flanges 20 at the bottoms of undulations 22 and at least portions of the bottoms of the supporting sidewalls 14 all lie in a common plane 15 such that the secondary grill 10 is supported with respect to plane 15. Thus, when the secondary grill is resting on the surface of a primary grill (not shown) the tops of the undulations 22 will be spaced vertically from the reference plane 15 which corresponds to the surface of the permanent grill. Therefore, it is apparent that larger foods placed on secondary grill 10 will rest on the tops of undulations 22, and smaller foods may rest at the bottoms of the undulations. In both cases the food will be spaced vertically from the reference plane, i.e., the surface of the primary grill, by either the side flanges 20 and sidewalls 14, which act as legs, or the tops of the undulations 22, or both.

The improved disposable secondary grill 10 also includes bendable tabs 24 extending inwardly from the inward side of top surface 12 in a plurality of positions, as shown in FIG. 1. the preferred embodiment includes eight of such tabs, but a greater or lesser number of tabs 24 may be included depending on the overall size of the secondary grill 10. The tabs 24 function as anchors which may be bent around the structure of the primary grill (not shown) in order to securely position the secondary grill 10 on the surface of the primary grill. This anchoring prevents the accidental movement of the secondary grill 10 during use. It also stabilizes the grill in a wind.

Referring now to FIGS. 2 through 5, the structural integrity and strength of the improved secondary grill 10 becomes apparent. As depicted therein, the members of the frame 11 and bar-like strips 18 are formed during manufacture to include the cross-sectional shape of an open C. The radius of curvature of the cross-sectional shape of the members of the frame 11 may be somewhat larger than the radius of curvature of the cross-section of bar-like strips 18, since the width of the strips 18 may be somewhat narrower than the width of the members of the frame 11. These cross-sectional shapes are formed into the thin, metallic material during the pressing process of manufacture. It is apparent that since the supporting sidewalls 14 and side flanges 20 position a quantity of the mass of the members of the frame 11 and strips 18, respectively, away from the central longitudinal axes 30 of the frame members 11 and strips 18, (see FIGS. 2 through 5) that, based on the principles of structural mechanics and properties of surfaces, the moments of inertia and thus the strength and rigidity of the frame members 11 and strips 18 are significantly increased. Consequently, the frame members 11 and strips 18 can support a greater load (i.e., a greater amount of food to be cooked) than would be the case if the grill were merely a flat sheet. Therefore, the grill will support a significant weight of food without permitting it to contact the primary grill. Further, the sidewalls 14 and flanges 20 provide positive spacing for the food even through the secondary grill is largely flattened by the weight of the food. The strength of the grill is further increased by providing intermediate frame members 13 similar in construction to the frame members 11. The use of the intermediate frame members 13 ties the side frame members together. It also divides the strips into several groups, thus reducing their length and increasing their rigidity. It, thus, helps to stabilize the structure of the grill.

As mentioned previously, the entire body forming the secondary grill 10 may be formed by die cutting and pressing from a thin sheet of metallic material. One such material is thin aluminum sheet or heavy aluminum foil. It is apparent that the gauge of the material may be varied to increase or decrease the strength of the grill 10 in order to approximate the strength of the grill 10 to the approximate weight of the types of food to be cooked thereon. For example, a thin aluminum sheet could be utilized to manufacture a grill 10 contemplated for the cooking of steaks or roasts, etc. Similarly, a heavy gauge aluminum could be utilized to manufacture a grill 10 contemplated for use only in cooking hamburgers and hot dogs.

DESCRIPTION OF ALTERNATIVE EMBODIMENTS

Figures 5, 6:
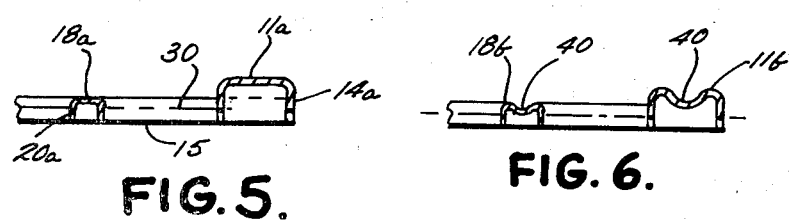
FIG. 5 is a fragmentary, cross-sectional view of an alternative embodiment of the invention taken along line V—V of the invention.
FIG. 6 is a view similar to FIG. 5 showing a still further modification of this invention.

FIG. 5 reveals an alternative embodiment of the cross-sectional shape of frame members 11a and bar-like strips 18a. As shown therein, frame members 11a and bar-like strips 18a may be formed with a substantially U-like shape thereby causing supporting sidewalls 14a and side flanges 20a, respectively, to depend vertically from frame members 11 and strips 18. Although the substantially U-like shape is somewhat more difficult to remove from the die used in manufacturing the grill 10, the use of the substantially V-like shape allows a somewhat greater vertical spacing of the food to be cooked from common plane 15 than does the open C cross-sectional shape. In addition, the substantially U-like shape is somewhat stronger than the open C cross-sectional shape since it provides neutral or almost vertical supporting legs rather than legs diverging at an angle.

Still further strengthening can be accomplished by forming a depending rib 40 in the crowns of the frame members 11b and strips 18b (see FIG. 6). This can be done without added material cost, since the additional material can be obtained from what would otherwise have been the waste pieces cut out to form the openings 16.

Figure 7:
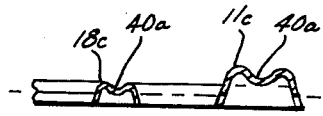
FIG. 7 is also a view similar to FIG. 5 showing a still further modification of this invention.

A further alternative modification, which also strengthens the product, may be accomplished as shown in FIG. 7. Frame members 11c and strips 18c may be formed in the shape of an open C, as described hereinbefore, with the additional formation of a rib 40a in the crowns thereof. As in the embodiment shown in FIG. 6, no additional material is required. The grill shown in FIG. 7, however, has the additional advantage of being more easily removed from the die during the manufacturing process.

Similarly, by so designing the anchoring tabs 24 that they extend into the openings 16, they may be formed from the waste material normally removed to form these openings. Therefore, providing these tabs does not increase the material costs of the product. By making the grill either square or rectangular in configuration, without any laterally projecting structure, maximum usage of material is attained--again contributing to an advantageous cost factor.

The design of the grill is such that it can be fabricated by a press which first blanks out the grill and then die forms it into its final shape in a single stroke. The grill is ideally shaped for nesting and therefore can be packaged very compactly for shipment. These factors also contribute to a cost reduction which adapts this invention for simple usage and disposal.

Thus, a strong, light-weight, yet inexpensive and disposable, secondary grill 10 is provided for use with primary grills. Consequently, the primary grills need not be cleaned in order to avoid the unsanitary surfaces thereof when a disposable secondary grill of the type disclosed herein is utilized.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A disposable, crushable secondary grill adapted to be laid over a primary grill for cooking by a radiant heat source, said secondary grill comprising: a unitary body formed of thin sheet metallic material such that said grill is crushable with moderate force; said body having a peripheral frame; said frame having supporting sidewalls depending therefrom extending along at least two opposite edges thereof; the bottom of at least portions of said sidewalls being in a common plane; a plurality of openings in said body to permit radiant heat to pass therethrough; said openings being defined by a plurality of spaced bar-like strips, said strips each having at least one depending side flange and lengthwise having a plurality of undulations; said flanges at the bottom of said undulations extending downwardly of said frame to a point in proximal relationship to the plane common to said portions of said bottom of said sidewalls, said flanges and sidewalls supporting said secondary grill such that food resting on the top surface thereof is spaced vertically from said common plane.

2. A secondary grill according to claim 1 wherein said plurality of strips each has a generally semi-circular cross-section opening downwardly, said flanges being the lengthwise sides of said strips.

3. A secondary grill according to claim 1 wherein said top surface is generally rectangular.

4. A secondary grill according to claim 3 wherein said bar-like strips comprise a plurality of generally parallel strips, and said frame includes at least one section generally perpendicular to and intermediate of said parallel strips.

5. A secondary grill according to claim 1 which further includes at least one bendable tab for securing said secondary grill to a primary grill.

6. A secondary grill as described in claim 5 wherein a plurality of said tabs are provided, said tabs extending into said openings.

7. A disposable secondary cooking grill adapted to be overlaid upon and supported by a primary grill, said secondary grill having a peripheral frame and a plurality of spaced strips within and integral with said frame and defining a plurality of openings therebetween; said frame and strips each being formed with depending side legs; said strips, and those portions of said frame extending in the same direction as said strips, being formed into a plurality of undulations with the bottoms of said undulations being in a first common plane and the tabs of said undulations being in a second common plane spaced vertically from said first common plane; said grill being an integral unit formed from a single piece of material.

8. A disposable secondary cooking grill as described in claim 7 wherein intermediate frame members extend across said grill; said strips being arranged in groups, on each side of said intermediate frame members, one end of each of said strips being integral with one of said intermediate frame members; said intermediate frame members being normal to the direction of said undulations.

9. A disposable secondary cooking grill as described in claim 8 wherein a plurality of bendable anchoring tabs are provided; said tabs being spaced about said grill, each being integral with said peripheral frame and extending into one of said openings.

* * * * *